United States Patent [19]

Nebel

[11] Patent Number: 4,881,600
[45] Date of Patent: Nov. 21, 1989

[54] HORSESHOE ASSEMBLY AND METHOD OF USING SAME

[76] Inventor: David J. Nebel, R.R. 3, Box 196A1, Dubuque, Iowa 52001

[21] Appl. No.: 125,366

[22] Filed: Nov. 25, 1987

[51] Int. Cl.⁴ .............................................. A01L 3/00
[52] U.S. Cl. ........................................ 168/11; 168/22
[58] Field of Search .............................. 168/11, 22, 28

[56] References Cited

U.S. PATENT DOCUMENTS

| | | | |
|---|---|---|---|
| 178,871 | 6/1876 | Murraine | 168/22 |
| 500,946 | 7/1893 | Pruden | 168/22 |
| 703,123 | 6/1902 | Dillon | 168/11 |
| 767,401 | 8/1904 | Glassbrook | 168/28 |
| 822,468 | 6/1906 | O'Connell | 168/22 |
| 970,267 | 9/1910 | Schwartz | 168/11 |
| 1,000,951 | 8/1911 | Sawicki | 168/22 |
| 1,241,016 | 9/1917 | Petric | 168/11 |

*Primary Examiner*—Robert P. Swiatek
*Attorney, Agent, or Firm*—Zarley, McKee, Thomte, Voorhees & Sease

[57] ABSTRACT

The horseshoe assembly of the present invention comprises a base shoe which is detachably secured to the bottom surface of the horse's hoof. A strap is attached at its opposite ends to the opposite sides of the base shoe and extends over the front upper surface of the horse's hoof to detachably secure the base shoe to the bottom of the horse's hoof. Small screws extend through the base shoe and into the hoof wall of the horse's hoof, but these screws do not extend into the white line of the horse's hoof as with conventional horseshoe nails. A second shoe, pad, or plate may be detachably secured to the undersurface of the base shoe. Different types of pads, shoes and plates can be attached to the bottom surface of the base shoe for particular purposes, and can be removed without requiring the removal of the base shoe. One modification of the invention comprises attaching a leg brace to the bottom surface of the base shoe, the leg brace having upwardly extending arms for attaching and supporting the horse's leg.

6 Claims, 5 Drawing Sheets

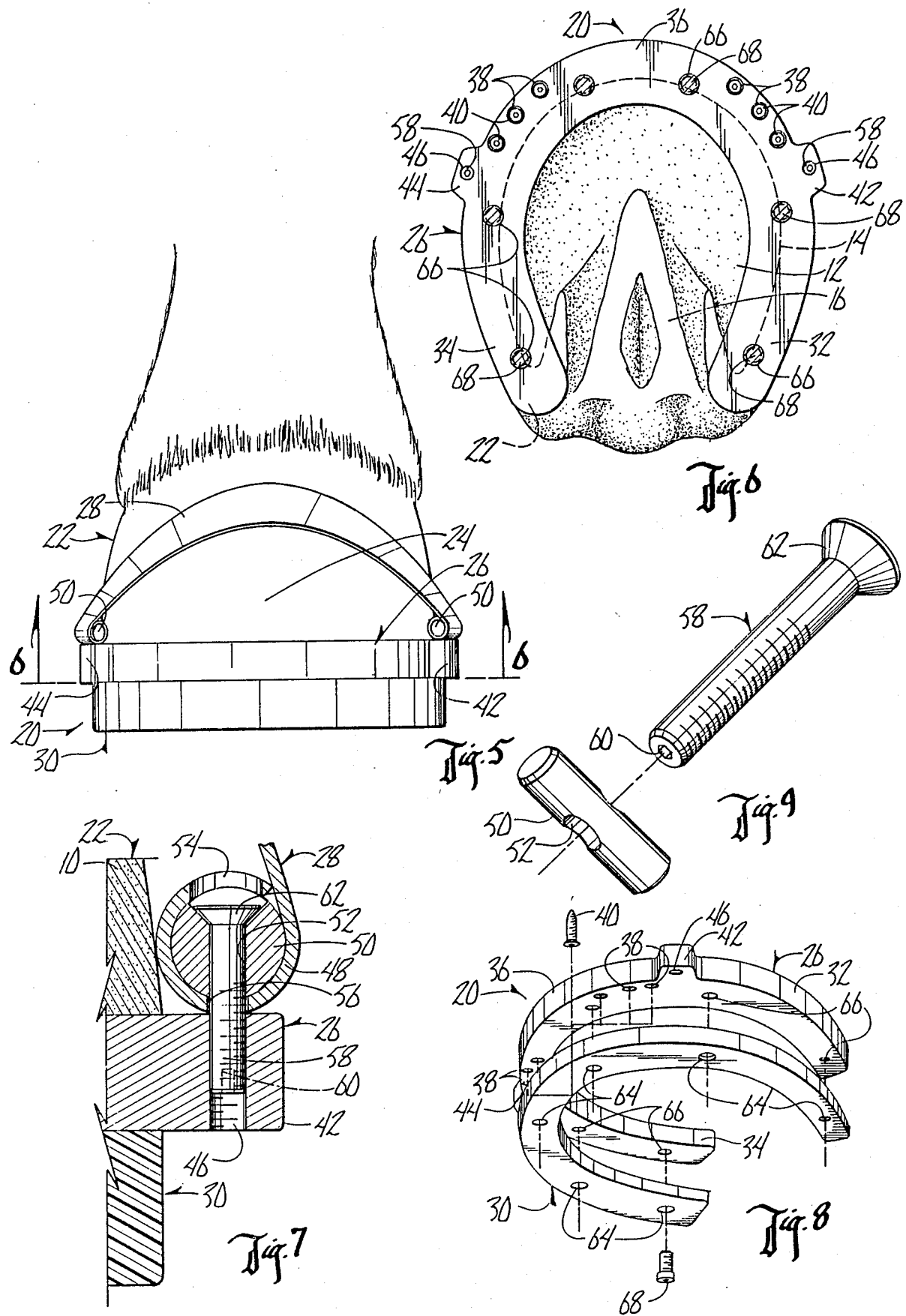

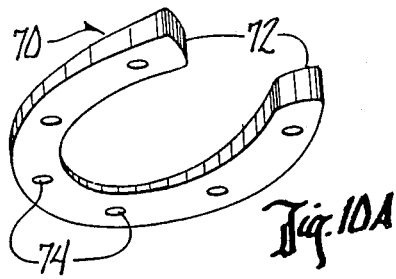
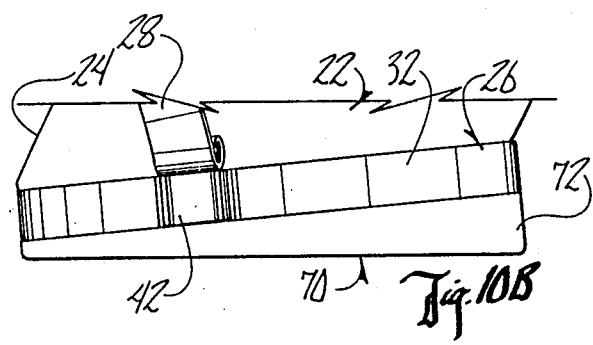
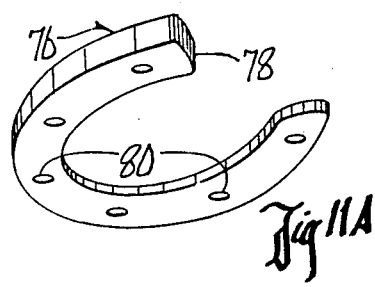
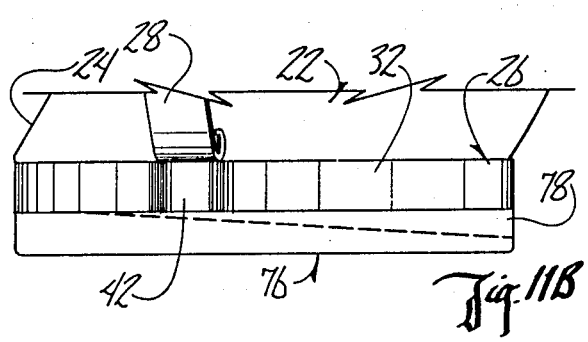
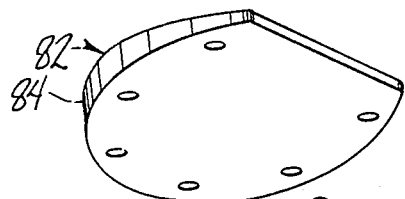
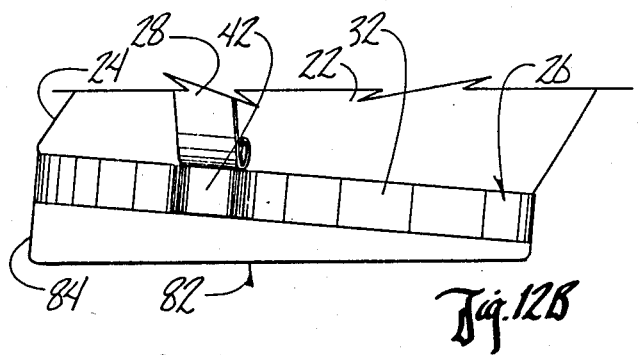
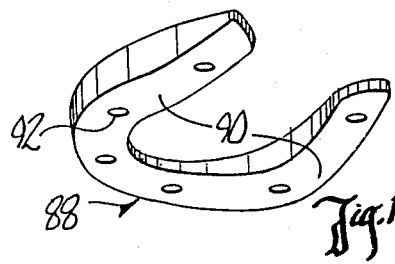
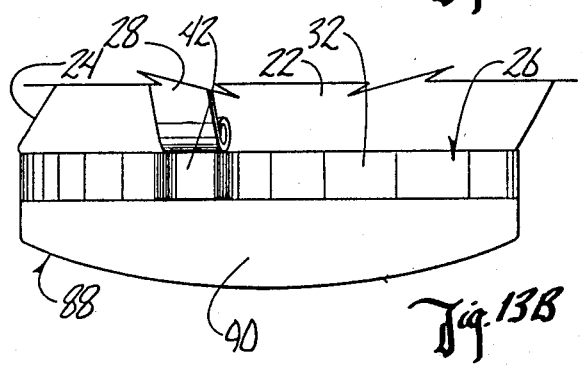
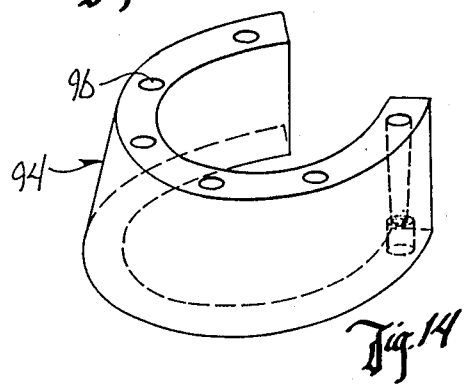

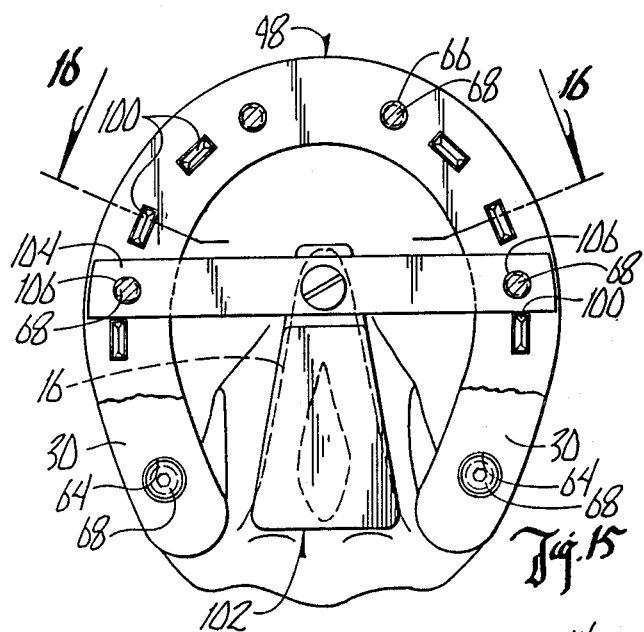
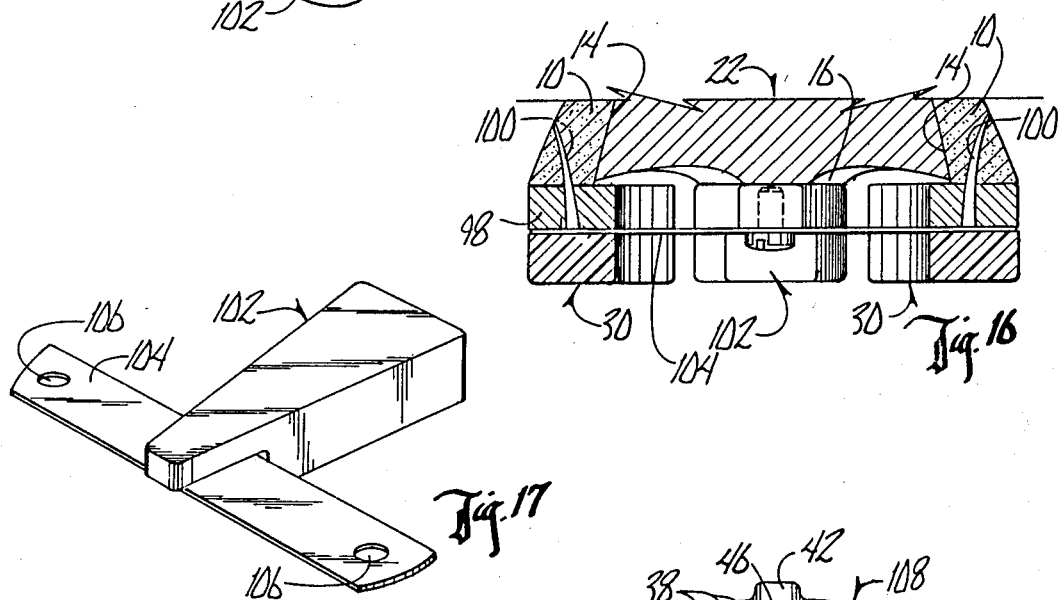
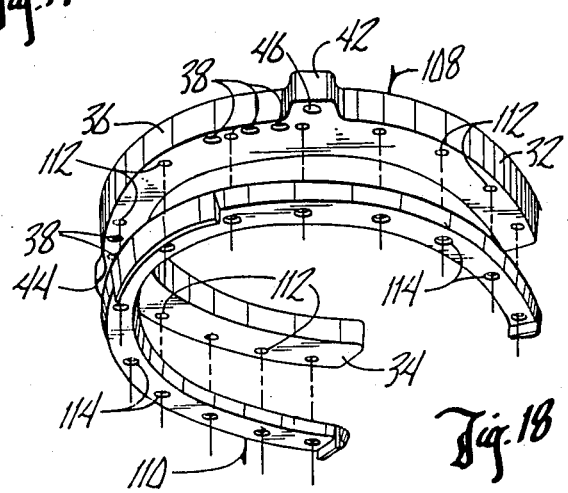

HORSESHOE ASSEMBLY AND METHOD OF USING SAME

BACKGROUND OF THE INVENTION

This invention relates to a horseshoe assembly and method for using same.

Conventional methods for shoeing horses involve nailing the shoe to the bottom of the horse's hoof. The nails extend through the shoe and upwardly into the white line which divides the dead tissue of the hoof wall from the live tissue of the sole of the hoof. The nail then is angled outwardly so that it remains in the hoof wall and does not protrude into the live tissue of the sole. A typical horse's hoof is shown in FIG. 1 and the prior art method for attaching shoes to the hoof is shown in FIG. 2. The hoof comprises an outer hoof wall 10, a sole 12, and a white line 14 which divides the hoof wall from the sole. The sole includes living tissue and the hoof wall includes dead tissue analogous to the fingernail tissue of humans. The white line is the dividing line between the living and the dead tissue. The horse's hoof also includes a frog 16 which normally receives pressure when the horse is walking. The frog serves the function of pumping circulation to the lower portion of the horse's leg and hoof in response to the pressure applied to the frog while the horse is walking. Oftentimes when a horse is shod, the shoe prevents pressure from being applied to the frog as the horse is walking, and this can sometimes result in inadequate circulation to the lower portion of the horse's leg and hoof.

In FIG. 2, a typical shoe 18 is shown attached to the lower end of a horse's hoof. The nails 19 extend upwardly through the shoe and into the hoof approximately at the white line 14. The nails are nailed so that they angle outwardly into the hoof wall.

There are several disadvantages to applying shoes in the conventional manner shown in FIG. 2. The nailing of the shoe into the hoof of the horse weakens the hoof by approximately 50%, thereby sometimes resulting in the cracking of the hoof. Also sometimes chunks of the hoof fall out or break off during the application of the shoes or during the wearing of the shoes by the horse.

Another disadvantage of present application of shoes is that the nails provide an invasion of the white line very closely adjacent to the living tissue of the sole 12. This can sometimes result in abscesses being formed within the horse's hoof. The likelihood of these abscesses is enhanced by the present methods since foreign matter is sometimes introduced into the bloodstream of the horse's hoof.

Another disadvantage of present shoeing methods is that the shoes often become loose, and are difficult to reattach securely.

Another disadvantage of present shoeing methods is that the shoe must be applied by a trained ferrier. If the person applying the shoe by present methods is not properly trained, it is possible to cause severe damage to the horse's hoof because the nail must be precisely driven relative to the hoof wall 10 and the white line 14. Failure to do so can result in serious damage to the horse's hoof.

Another disadvantage of present shoeing methods is that the shoes cannot be conveniently removed and replaced with different types of shoes for different applications. Each time the shoe is removed, the hoof is weakened, and the nail holes in the hoof remain exposed for possible invasion by foreign matter and bacteria. It is desirable to change the shoes for the horse depending upon the particular use which is being made of the horse. Sometimes non-slip shoes or pads are required, and other times various types of plates, pads or shoes are required, depending upon the particular use to which the horse is being put.

Another disadvantage of present methods is that it is difficult to apply various types of braces to the horse's foot, since the brace must be nailed to the bottom of the horse's hoof, and cannot be readily removed.

Therefore, a primary object of the present invention is the provision of an improved horseshoe assembly and method of using same.

A further object of the present invention is the provision of a horseshoe assembly which does not require the use of nails protruding into the horse's hoof.

A further object of the present invention is the provision of a horseshoe assembly and method for using same which limits the distance which nails, screws or other items must protrude into the horse's hoof, and which keeps the nails, screws, etc. completely away from the white line and the sole portion of the hoof.

A further object of the present invention is the provision of a horseshoe assembly and method of using same which permits the quick and easy removal and reattachment of a shoe to the horse's hoof, without weakening the horse's hoof, and without requiring new nail holes to be formed in the horse's hoof.

A further object of the present invention is the provision of an improved horseshoe assembly and method of using same which permits the tightening of the securement of the shoe to the horse's hoof by untrained personnel.

A further object of the present invention is the provision of a horseshoe assembly and method of using same which can be attached and detached without requiring a ferrier or other specially trained person.

A further object of the present invention is the provision of a horseshoe assembly which includes a base shoe attached to the bottom of a horse's hoof, the base shoe being capable of detachably receiving various types of shoes, plates or pads without the necessity of removing the base shoe.

A further object of the present invention is the provision of a horseshoe assembly which can accommodate a leg brace which can be attached or removed without removing the shoe.

SUMMARY OF THE INVENTION

The present invention involves the application of a base shoe to the bottom of the horse's hoof. The base shoe includes a strap attached at its opposite ends to the opposite sides of the shoe. The strap extends upwardly over the front curved portion of the horse's hoof. Adjustable securing means are provided at the opposite ends of the strap for permitting the tightening or loosening of the strap. This permits the adjustment of the tightness with which the shoe is held to the bottom of the horse's hoof, and the adjustment may be made by an untrained person without the need of a trained ferrier.

The base shoe has a plurality of threaded openings therein for permitting the attachment of various types of pads, plates or shoes to the bottom surface of the base shoe. These various pads, plates or shoes can be exchanged without removal of the base shoe from the horse's hoof.

A leg brace is provided by the present invention which can be attached to the bottom surface of the base shoe. The leg brace includes upwardly extending arms which are pivotally adjustable to the desired angle, and which include a strap at their upper ends for attachment to the horse's leg. The brace can be adjusted or removed and reattached without the necessity of removing nails from the bottom of the horse's hoof, as is the case with present devices.

Another modification of the present invention comprises the attachment of a pumping pad to the base shoe assembly. The pumping pad is interposed between the frog of the horse's hoof and the supporting surface upon which the horse walks. The pad transfers pressure from the supporting surface to the frog, thereby causing the frog to pump and recirculate blood to the lower portions of the horse's hoof and leg in a manner very similar to that normally obtained when the horse walks without shoes.

BRIEF DESCRIPTION OF THE FIGURES OF THE DRAWINGS

FIG. 5 is a front elevational view of the device shown in FIG. 4.

FIG. 6 is a sectional view taken along line 6—6 of FIG. 5.

FIG. 7 is an enlarged sectional view taken along lines 7—7 of FIG. 4.

FIG. 8 is a perspective exploded view of the base shoe and secondary shoe of the present invention.

FIG. 9 is an exploded perspective view of the screw assembly utilized at the end of the securing strap of the present invention.

FIGS. 10A-13A are perspective views of various types of corrective shoes.

FIGS. 10B-13B are partial side elevational views showing the application of the shoes in FIGS. 10A-13A to the bottom of a horse's hoof.

FIG. 14 is a perspective view of a block pad which can be attached to the base plate of the present assembly.

FIG. 15 is a bottom plan view of a modified form of the present invention utilizing a nail attached base shoe and a pumping pad.

FIG. 16 is a sectional view taken along line 16—16 of FIG. 15.

FIG. 17 is a perspective view of the pumping pad shown in FIGS. 15 and 16.

FIG. 18 is an exploded perspective view of a modified form of the present invention utilizing a base shoe and a racing plate.

DETAILED DESCRIPTION OF THE PREFERRED EMBODIMENT

Figure 1:
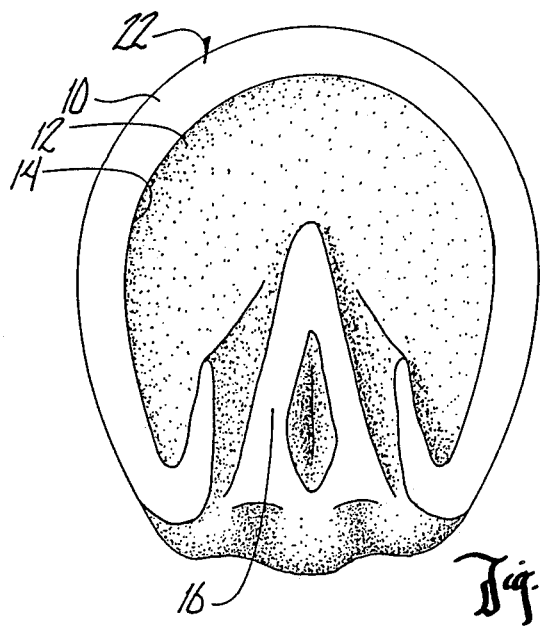
FIG. 1 is a bottom view of a typical horse's hoof.
Figure 2:
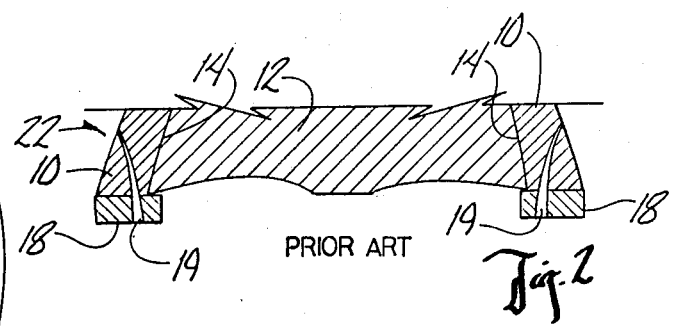
FIG. 2 is a partial sectional view of a horse's hoof having a shoe applied thereto in conventional prior art manner.
Figure 3:
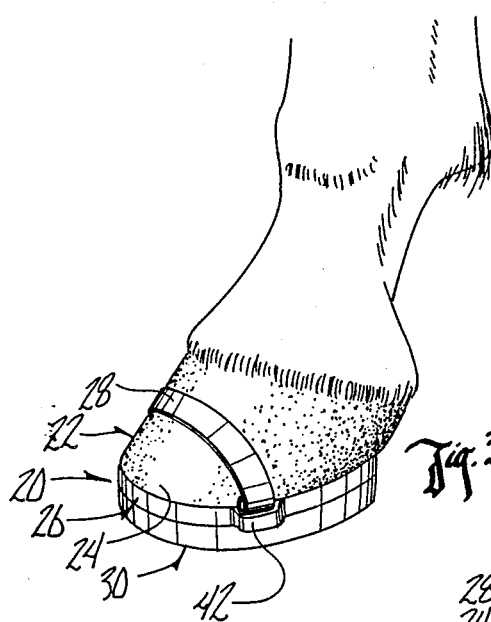
FIG. 3 is a perspective view of a horse's hoof having the present invention applied thereto.

Referring to FIGS. 3-9, a shoe assembly 20 is shown attached to the hoof 22 of a horse. The hoof 22 includes a curved front surface 24 and also includes the hoof wall 10, sole 12, white line 14, and frog 16 shown in FIG. 1.

Shoe assembly 20 comprises a base shoe 26, a securement strap 28 and a secondary shoe or pad 30.

Figure 4:
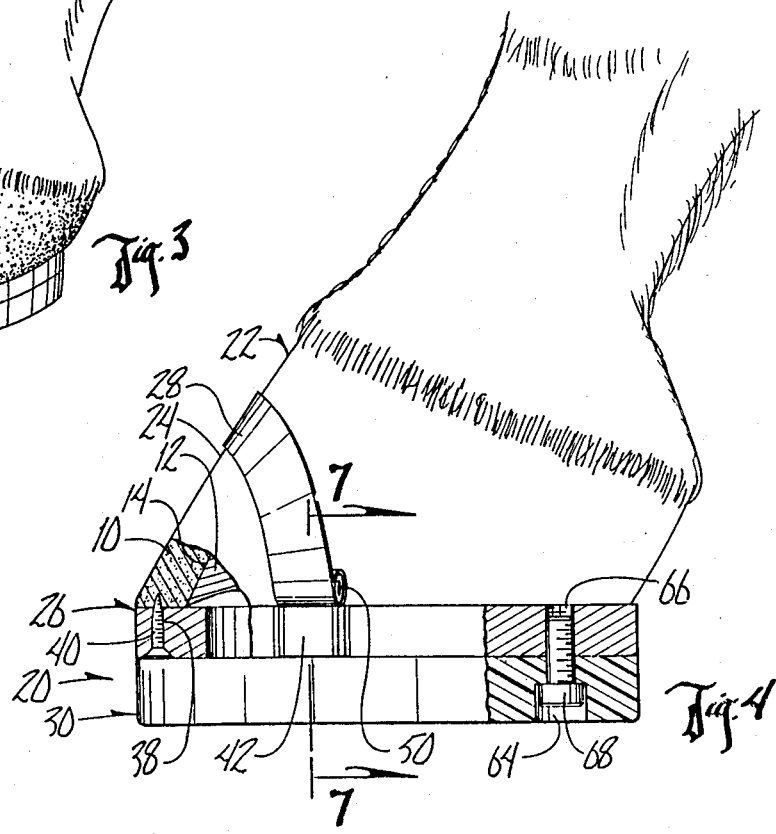
FIG. 4 is an enlarged side elevation view of the device shown in FIG. 3, with portions thereof broken away in section.

Base shoe 26 is formed into a U-shape which conforms to the bottom edge of the horse's hoof. Base shoe 26 includes spaced apart U-legs 32, 34 and closed front end 36. Positioned adjacent the front edge 36 are a plurality of attachment screw openings 38 which are located very close to the outer edge of base shoe 26 so that they can receive screws 40 in a position which is located outwardly from the white line 14 of the horse's hoof as can be seen in FIG. 6. As can be seen in FIG. 4, screws 40 extend only a short distance into the hoof wall 10 of the horse's hoof. Preferably these screws 40 will extend one-eighth inch to one-fourth inch into the hoof wall. The primary function of screw 40 is to prevent lateral movement of the base shoe 26 with respect to the horse's hoof. Screws 40 do not provide the function of holding the shoe tightly against the bottom of the horse's hoof.

This function is provided by the strap 28 which is attached to two outwardly extending flanges 42, 44 on the opposite sides of base shoe 26. Each flange 42, 44 includes a threaded opening 46 therein.

The opposite ends of strap 28 are coiled into a sleeve 48 (FIG. 7) which is adapted to receive a plug 50 therein. Plug 50 includes an opening 52 therein and sleeve 48 includes similar openings 54, 56 therein which can be registered with opening 52 of plug 50. Extending through openings 52, 54 and 56 is a threaded bolt 58 which includes an Allen wrench receiving opening 60 at the lower end thereof, and a head 62 at the upper end thereof. Bolt 58 is threadably received within threaded opening 46 of flanges 42 on base shoe 26.

In order to apply base shoe 26 to the bottom of a horse's hoof, the strap 28 is first attached at its opposite ends to flanges 42, 44 by threading bolts 58 into threaded openings 46. The base shoe is then applied to the horse's hoof with the strap 28 extending over the front arcuate portion 24 of the horse's hoof. Screws 40 are then inserted into the hoof wall 10 of the horse's hoof so as to temporarily secure the base plate 26 into proper registered alignment with the bottom of the horse's hoof. Next, an Allen wrench is inserted into the opening 60 at the bottom of bolts 56 and the bolts are threaded downwardly into threaded openings 46 so as to tighten strap 28 against the front arcuate surface 24 of the horse's hoof. This securely fastens the base shoe 26 to the bottom of the horse's hoof. The screws 40 serve the primary function of preventing lateral movement of the shoe with respect to the horse's hoof, but they do not extend nearly as far into the horse's hoof as conventional nails used in conventional shoeing practices. Furthermore, the screws 40 do not extend into the white line of the horse's hoof, but only extend into the dead tissue of the outer hoof wall.

Secondary shoe 30 as shown in FIGS. 1-9 is a rubber pad in the shape of a horseshoe. Shoe 30 includes a plurality of securing holes 64 around its circumference, located in the approximate centerline of the shoe. These openings 64 are positioned to register with threaded openings 66 in base shoe 26 so that bolts 68 (FIG. 4) can be extended through openings 64 and threaded into openings 66, thereby securely attaching the shoe or pad 30 to the bottom surface of base plate 26.

In the event that it is desired to replace shoe 30, all that is necessary is to remove bolts 68 and to reattach a new shoe. This can be done in the event that shoes 30 wear out, or in the event that it is necessary to apply a different kind of shoe for a different purpose.

FIGS. 10-14 show various types of shoes which can be attached to the base plate 26 for different applications. In FIGS. 10A and 10B, a corrective pad 70 having a raised heel portion 72 is shown. Pad 70 includes openings 74 which are adapted to register with threaded openings 66 in base plate 26 so as to permit the securement of pad 70 to the bottom surface of plate 26.

FIG. 11A shows a toe-in or toe-out pad 76 having a raised portion 78 and openings 80 adapted to register with openings 66 of base plate 26.

FIGS. 12A and 12B show a founder pad 82 which is solid in construction and which includes a raised front portion 84 and a plurality of openings positioned to register with threaded opening 66 of base plate 26.

FIGS. 13A and 13B show a rest pad 88 having a centrally located rounded portion 90 and a plurality of openings 92 positioned to register with the opening 66 in base plate 26.

FIG. 14 shows a flat rubber driving pad 94 which can also be attached to base plate 26. Pad 94 includes a plurality of openings 96 which will register with opening 66 of base plate 26. Openings 96 are trapered so as to be slightly larger in diameter at their upper ends than at their lower ends. This permits the slight movement of the bolts extending within opening 96 so that the bolts can properly register with the openings 66 in base plate 26.

Referring to FIGS. 15-17, a modified form of the base plate is shown and is designated by the numeral 98. Base plate 98 includes holes 66 which are similar to the holes 66 in base plate 26. However, the base plate 98 is adapted to be secured to the bottom of a horse's hoof in a manner similar to the conventional manner for mounting shoes to the bottom of a horse's hoof. That is, nails 100 are driven into the bottom of the horse's hoof adjacent the white line 14 and are angled outwardly into the hoof wall 10 of the horse's hoof as shown in FIG. 16. Once base shoe 98 is mounted to the bottom of the horse's hoof, a shoe or pad such as secondary pad 30 may be attached to the undersurface of base shoe 98 in the same fashion as pad 30 is attached to the undersurface of base shoe 26.

Also shown in use in combination with base plate 98 is a pumping pad 102. While pumping pad 102 is shown in use with base plate 98, it can also be used in combination with base plate 30 in the same fashion. Pad 102 includes an attachment strap 104 having openings 106 in the opposite ends thereof. Pad 102 is attached to base shoe 98 in the fashion shown in FIG. 15, with openings 106 being in registered alignment with openings 66 of base shoe 98 so as to receive bolts 68 when the secondary shoe 30 is applied. Pad 102 extends rearwardly and is interposed between the frog 16 of the horse's hoof and the supporting surface on which the horse is standing. The purpose of pad 102 is to fill in the space created by the application of base shoe 98 and secondary shoe 30 so as to properly transfer pressure from the ground or supporting surface to the frog of the horse's hoof. This permits the frog to perform its natural function, which is to pump and circulate blood through the lower end of the horse's hoof during normal movement of the horse. This use of the pumping pad 102 is believed to restore the natural function of the frog of the horse's hoof which is lost during the use of conventional horseshoes, since the frog is raised above the supporting surface and does not receive pressure from the supporting surface during normal movement of the horse. By transferring the pressure from the supporting surface to the frog, it is believed that better circulation is obtained for the lower end of the horse's hoof thereby resulting in a healthier horse and fewer problems resulting from poor circulation in the horse's lower leg or hoof.

FIG. 18 is a perspective view of a further modified base shoe 108 which is specially adapted to accommodate a racing plate 110 which can be constructed out of plastic of other light material. Base plate 108 is nearly identical to base plates 30 with the exception that base plate 108 includes specially located threaded openings 112 which are positioned to register with openings 114 in race plate 110. All other portions of base plate 108 are the same as base plate 30 and are indicated by corresponding numerals.

Figure 19:
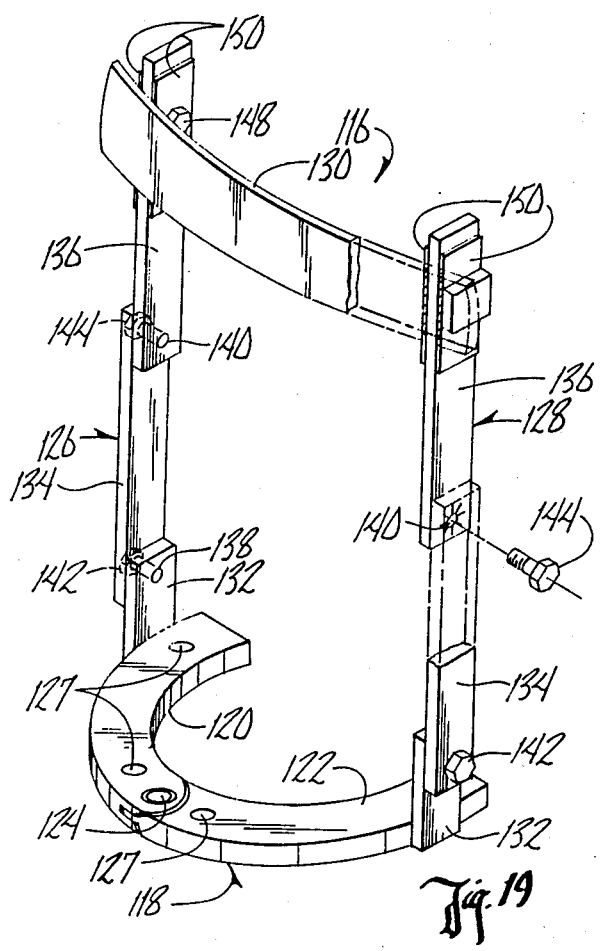
FIG. 19 is a persective view of a support brace which can be utilized with the base shoe of the present invention.
Figure 20:
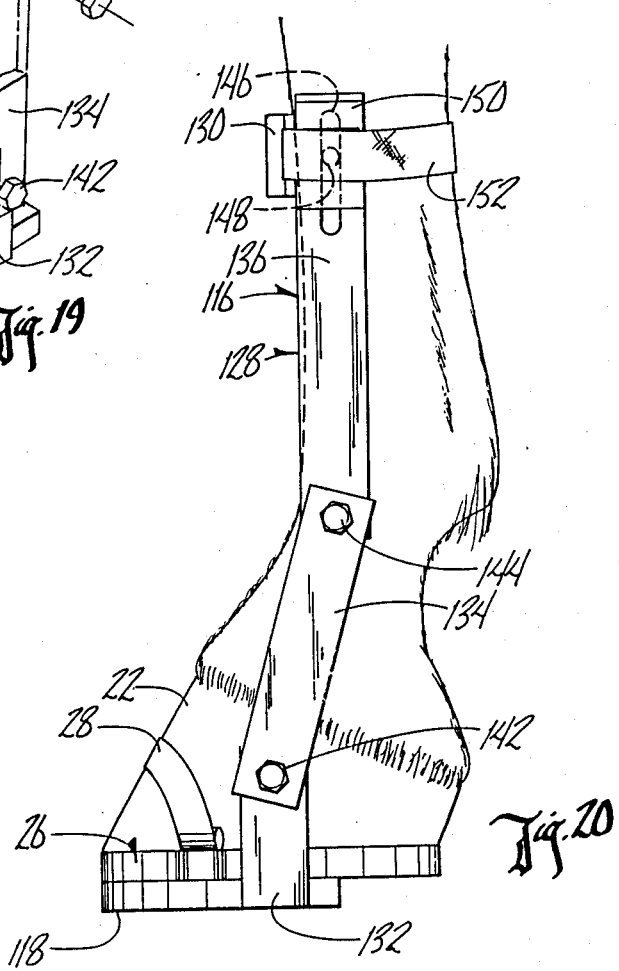
FIG. 20 is a side elevational view showing the support brace mounted on the hoof of a horse.

Referring to FIGS. 19 and 20, a leg brace 116 is shown. Leg brace 116 includes a U-shaped shoe 118 which is comprised of two leg members 120, 122 which are pivotally connected at their forward ends by means of a hinge pin 124. Shoe 118 includes a plurality of bolt openings 127 which are positioned to register with the openings 66 in base plate 26. The pivotal movement about hinge pin 124 of the two leg members 120, 122, permits the shoe 118 to be adjusted to various sizes of base plates 26 without requiring a new specially shaped shoe 18 for use with different sizes of base plates 26.

Extending upwardly from the opposite sides of shoe 118 are a pair of support members 126, 128 which are connected at their upper ends by a cross-strap 130. Each support member 126, 128 is comprised of a lower link 132 which is welded or otherwise fixed to the shoe 118 and which extends upwardly therefrom. First and second links 134, 136 are then pivotally connected to each other and to links 132 for pivotal movement about bolt axes 138, 140 which receive bolts 142, 144. Bolts 142, 144 may be tightened or loosened so as to permit the desired angular adjustment of the various links 132, 134, 136 with respect to one another. The upper ends of links 136 are provided with an elongated slot 146 for receiving bolts 148, which extend through spaced apart flanges 150 which in turn are welded or otherwise fixed to cross-strap 30. This permits cross-strap 30 to be adjusted upwardly and downwardly within slot 146 so that it can be positioned as desired relative to the horse's leg.

As can be seen in FIG. 20, the leg brace 116 can be quickly attached or detached to the bottom of the base shoe 26 and the particular links 132, 134, 136 can be adjusted to the desired position relative to the horse's leg. Similarly, strap 130 can be raised or lowered to the desired position and is adapted to receive a flexible strap 152 for securement to the horse's leg as shown in FIG. 20.

With prior leg braces, it was necessary to nail the brace to the bottom of the horse's hoof in the conventional manner utilized for horseshoes. Therefore, in order to remove the brace from the horse's hoof, it was necessary to remove the nails and to re-apply the brace required renailing the shoe to the bottom of the horse's hoof. This was a cumbersome and inconvenient process, and the present invention greatly simplifies this process by permitting the quick and easy attachment of the shoe 118 to the base shoe 30.

The base 116 is also advantageous over prior braces in that it can be quickly adjusted merely by loosening bolts 142, 144 and 148 and by adjusting the position of the brace as desired before retightening the bolts.

The present invention is not limited to the use of the particular secondary shoes shown in the drawings, and many different types of shoes for unique purposes can be attached to the base plate 26 of the present invention as desired.

Thus, it can be seen that the device accomplishes at least all of its stated objectives.

What is claimed is:

1. A horseshoe assembly for shoeing the hoof of a horse, said hoof having an arcuate front surface and a bottom surface comprising an approximately U-shaped hoof wall having an outer edge and an inner edge, a sole located radially inwardly from inner edge of said U-shaped hoof wall, a substantially U-shaped white line located between said sole and said inner edge of said U-shaped hoof wall, and a frog located adjacent and between the U-shaped ends of said white line; said assembly comprising:

a substantially U-shaped base shoe having a closed forward end and a pair of spaced apart legs extending rearwardly therefrom to terminate in spaced apart legs ends, said base shoe having an upper flat surface, a lower flat surface, an outer U-shaped edge, and an inner U-shaped edge, said outer U-shaped edge conforming in size and shape to said outer edge of said hoof wall;

an elongated strap means having opposite ends, strap attachment means operatively connecting said opposite ends of said strap means to said spaced apart legs of said U-shaped base shoe, said strap means extending upwardly from said spaced apart legs in an arcuate shape capable of retentive engagement with said arcuate front surface of said horse's hoof when said upper surface of said base shoe is in registered facing relation with said bottom surface of said horse's hoof;

said strap attachment means comprising a horizontal sleeve at each of said opposite ends of said strap means, said sleeve having a vertically registered pair of sleeve openings therein, an elongated threaded bolt having an upper end with a head thereon and a lower end with an Allen wrench receiving opening therein, said bolt extending through said vertically registered pair of sleeve openings with said lower end thereof protruding downwardly below said sleeve;

said base shoe having a pair of threaded tightening openings extending vertically therethrough in registered alignment below said pairs of sleeve openings in said sleeves at said opposite ends of said strap means; each of said tightening openings having an open upper end and an open lower end;

said lower ends of said threaded bolts extending within and threadably engaging said threaded tightening openings of said base shoe, said Allen wrench receiving openings of said bolts being accessible through said lower ends of said tightening openings.

2. A horseshoe assembly according to claim 1 comprising first securing means on said base shoe, said first securing means extending upwardly from said base shoe and being positioned to retentively engage only said hoof wall of said hoof when said base shoe is in registered facing engagement with said botton surface of said horse's hoof for cooperation with said strap means to hold said base shoe against horizontal movement relative to said horse's hoof.

3. A horseshoe assembly according to claim 2 wherein said first securing means comprise at least one screw extending upwardly from said base shoe, said screw being positioned relative to said base shoe for threadably engaging only said hoof wall of said horse's hoof when said base shoe is in registered facing engagement with said bottom surface of said horse's hoof.

4. A horseshoe assembly according to claim 1 wherein said base shoe includes a plurality of threaded attachment openings spaced apart from one another and extending upwardly from said bottom surface thereof, a second U-shaped shoe having an outer edge conforming in approximate size and shape to said outer U-shaped edge of said base shoe, a plurality of screws extending through said second U-shaped shoe and threadably engaged within said attachment openings of said base shoe for detachably securing said second U-shaped shoe to said base shoe.

5. A base shoe assembly according to claim 4 wherein said second U-shaped shoe is selected from the group consisting essentially of a rubber pad, a driving pad, a tapered corrective pad, and a racing plate.

6. A horseshoe assembly according to claim 1 and further comprising a pair of cylindrical plugs, each extending horizontally through one of said sleeves, said plugs each including a diametric plug bore extending diametrically therethrough and being in registered alignment with said pair of sleeve openings, said bolts extending through said plug bores.

* * * * *